United States Patent [19]

Ramsey et al.

[11] 3,799,144
[45] Mar. 26, 1974

[54] SOLAR HEAT SOURCE AND RECEIVER SYSTEM

[75] Inventors: James W. Ramsey, Golden Valley; Roger N. Schmidt, Minnetonka; Carl B. Petersen, Fridley, all of Minn.

[73] Assignee: The United States of America as represented by the Secretary of the Air Force, Washington, D.C.

[22] Filed: Mar. 21, 1972

[21] Appl. No.: 236,629

[52] U.S. Cl.................................. 126/270, 165/105
[51] Int. Cl............................................... F24j 3/02
[58] Field of Search .......... 126/270; 60/26; 165/105

[56] References Cited
UNITED STATES PATENTS

| | | | |
|---|---|---|---|
| 3,029,596 | 4/1962 | Hanold et al. .................. | 126/270 X |
| 3,535,543 | 10/1970 | Dailey............................ | 165/105 X |
| 3,234,931 | 2/1966 | Whitaker....................... | 126/270 |
| 3,364,676 | 1/1968 | Miller............................ | 126/270 X |

*Primary Examiner*—Meyer Perlin
*Assistant Examiner*—Ronald C. Capossela

[57] ABSTRACT

A system for collecting solar heat to meet high power heat requirements as in a Vuilleumier cycle cryogenic refrigerator, in space application. The system includes a short focal-length-to-diameter ratio collector, a heat receiver having a convex surface attached to a heat pipe further containing a heat storage element which is connected to the use, i.e. a cryogenic refrigerator. The heat receiver utilizes a novel coating allowing the system to realize an effeciency in excess of fifty percent.

3 Claims, 4 Drawing Figures 3,799,144

SOLAR HEAT SOURCE AND RECEIVER SYSTEM

BACKGROUND OF THE INVENTION

This invention relates generally to solar heat sources and more particularly to a highly efficient solar heat source to power Vuilleumier cycle cryogenic refrigerators or other equipment having high input requirements in space.

With the introduction of Vuilleumier cycle refrigerators in space applications, there has developed a need for a reliable, lightweight and inexpensive heat source to supply power for long term operation. These coolers offer advantages for long-duration space applications and differ from other coolers in that they use heat as the primary mode of power.

The more conventional and well known solar cell power systems first convert solar radiant energy to electrical energy and then back to heat by resistance heating. Such systems are obviously inefficient because of the photo-electric conversion. Since coolers of the future will require kilowatt power levels and hundreds of square feet of solar cells, weight and reliability will become a factor in space applications.

Prior art heat collecting systems have required the utilization of highly sophisticated pointing systems to direct collecting mirrors or solar cells or other devices toward the sun. These systems are large and in general require larger and heavier deployment mechanisms. The receivers of heat in known collecting systems also tend to re-radiate a substantial portion of the collected heat, thereby further degrading the efficiency of the system.

The solar heat source system compares very favorably with other power sources currently in existance, for example, the instant invention has an efficiency of 50 percent compared with four percent for solar cell systems. The solar heat source costs about one tenth that of a solar cell system for kilowatt power levels. The collector is hard to nuclear and space radiation as compared with solar cells.

Further, the instant system provides a weight reduction of 75 percent over solar cell systems and ninety percent over nuclear reactor systems. In addition, the invention is less hazardous than nuclear systems and avoids the problem of nuclear radiation detector interference.

SUMMARY OF THE INVENTION

The system of this invention collects heat from the sun during a solar passage of the satellite. The solar heat source system delivers heat to the use location and also stores heat for use during the satellite's shadow passage. Of particular importance in a system of this nature is the operating efficiency. In a space application where power requirements reach 10,000 watts a low efficiency system would be impracticable due to weight and space considerations.

Heat from the sun is collected by a paraboloid dish-shaped mirror supported by a two-axis gimbal set and controlled by a sun sensing system.

Positioned at the focal point of the collector is a hollow sphere coated with a selective black coating. The sphere is attached to a heat pipe wherein the heat is transferred to the use point. Along the heat pipe a heat storage element is located to provide continuous heating whether or not the collector is in sunlight.

In addition, the invention is provided with a sensing system in order that the mirror may be turned to collect the greatest amount of solar radiation available.

It is therefore an object of the invention to provide a new and improved system for collecting and receiving solar heat.

It is another object of the invention to provide a system for collecting and receiving solar heat that is more efficient than any hitherto known.

It is a further object of the invention to provide a system for collecting and receiving solar heat that is inexpensive, light in weight and reliable.

It is still another object of the invention to provide a system for collecting and receiving solar radiation that will produce high heat power for long term space applications.

It is still a further object of the invention to provide a system for collecting and receiving solar radiation that is uneffected by space and nuclear radiation.

These and other advantages, features and objects of the invention will become more apparent from the following description taken in connection with the illustrative embodiments.

DESCRIPTION OF THE PREFERRED EMBODIMENT

Figure 1:
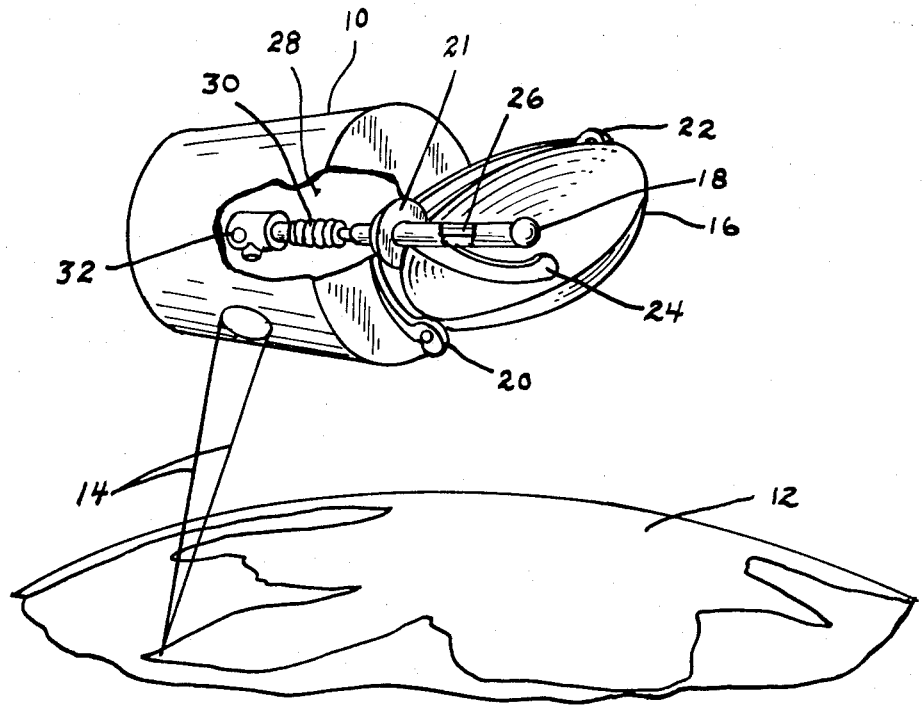
FIG. 1 is a perspective view of the invention utilized in a space satellite.

Referring now to FIG. 1, a satellite 10 is shown orbiting the earth and in telemetry contact with an earth station represented by 14. Mounted on the satellite is a parabolic mirror collector 16 so constructed to intercept and concentrate solar radiance by a factor of approximately 50 at the surface of the receiver 18. The mirror may be stretch-formed aluminum or other construction with a vapor-deposited aluminum surface, and so manufactured to allow it to be folded during the satellites insertion into earch orbit. Folding may not be required if the mirror is relatively small.

The mirror is supported by the two axis gimbols 20, 21 and 22 which permit an independent motion in two axis about the vehicle roll axis and about an axis normal to the roll axis. The mirror 16 is provided with a slot 24, extending through one-half of the mirror, thereby providing sufficient clearance for the mirror to pass the heat pipe 26. This permits pointing the mirror in any direction.

The heat pipe extends through the gimbal 21 to the interior of the satellite 28 where the heat storage unit 30 is located. At the end of the heat pipe is positioned the heat use; shown in the figure as a cryogenic cooler 32.

Figure 2:
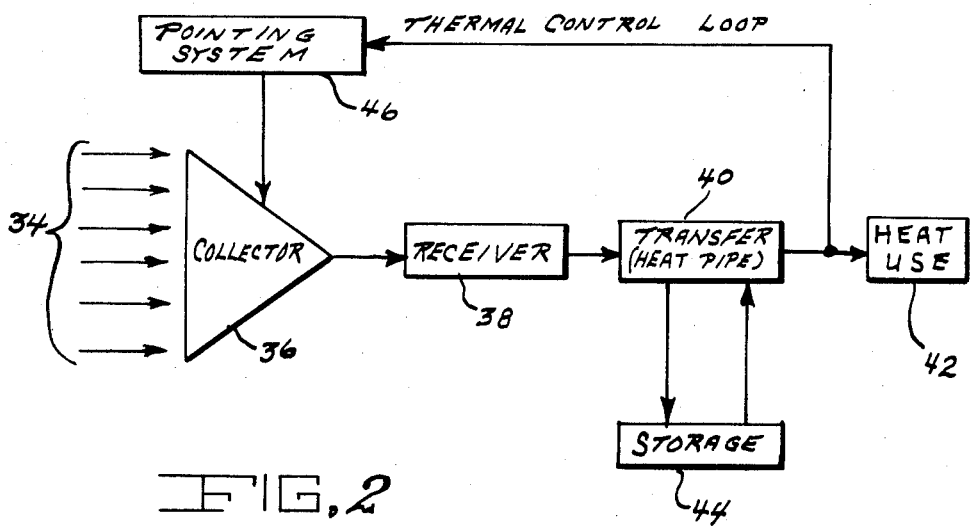
FIG. 2 is a block diagram of the system of the invention.

Concerning FIG. 2, sun 34 enters the collector 36 where it is focussed on the receiver 38 and the solar radiant energy in the form of heat is transferred through the heat pipe 40 to the "use" 42. A portion of the heat is drawn from the heat pipe and stored at 44 to be used during periods when the collector is in a shadow orbit. The collector 36 is controlled by the pointing system 46 which forms part of a thermal control loop and may be one of a plurality currently available for this purpose.

Figure 3:
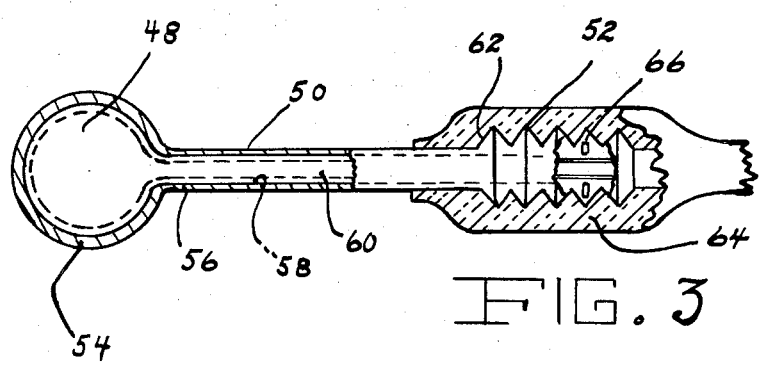
FIG. 3 is a side elevational view partly in section of the heat tube and heat storage unit of the invention.

In FIG. 3, is shown the receiver 48, heat pipe 50 and heat storage element 52. The receiver, a hollow sphere coated with selective black coating 54, efficiently absorbes as heat, the concentrated solar energy with a minimum of re-radiation to space. The receiver is sized such that the energy flux incident on it is approximately 50 times the solar flux. This low concentration level permits wider tolerances in both pointing accuracy and collector contour. The spherical shape of the receiver permits uniform absorption of the solar energy independent of collector orientation.

The heat pipe 50 is a transfer mechanism which carries absorbed heat from the receiver to the point of use and the storage element. During passage of a space body through shadow, the heat pipe transfers energy from storage to the use point. The heat pipe is constructed with a molybdenum shell 59 and contains a molybdenum mesh wick 58 and a potassium working fluid 60. Shell 59 may be something other than molybdenum.

The heat storage element 52 consists of a bellowslike container 62 surrounded by an appropriate insulation 64. The bellows contains lithium hydride or other suitable phase change material as a heat storage material which surrounds the heat pipe. As the heat pipe functions, heat is drawn off through fins 66 and the lithium hydride is heated and expands in the bellows container. As the heat pipe cools during a shadow period, the lithium hydride gives up its heat to the heat pipe and thus the system remains in equilibrium.

Figure 4:
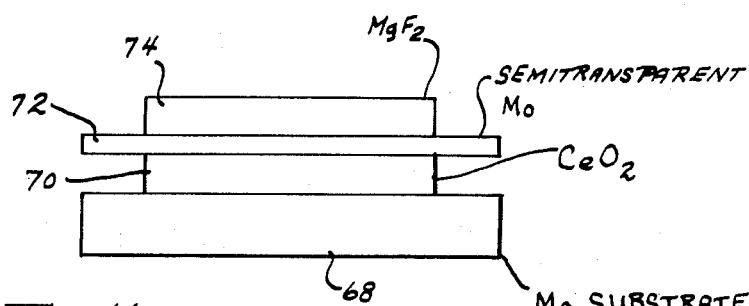
FIG. 4 is a sectional view of the selective coating utilized in the heat receiver portion of the invention.

FIG. 4 shows a sample configuration for the selective black coating utilized in the receiver. On a molybdenum substrate 68 is mounted on a layer of cerium oxide 70 over which is placed a semi-transparent layer of molybdenum 72 which is in turn covered by a layer of magnesium fluoride 74. This coating selectively absorbs in the solar spectrum and has a low emmitance for reradiation.

An alternative coating for the receiver would consist of an aluminum oxide coating on a molybdenum substrate having a semi-transparent molybdenum covering with a second layer of aluminum oxide placed on the covering.

Having thus described our invention of a system for a solar heat source we make the following claims:

1. A system for collecting and storing heat from solar radiation comprising: a solar radiation collecting means, including a paraboloid dish-shaped mirror having a short focal-length-to diameter ratio; a hollow sphere means covered externally with successive layers of cerium oxide, molybdenum and magnesium fluoride on a molybdenum substrate, for receiving and converting solar radiation to heat; means connected to the said hollow sphere means for transferring heat to a heat use means; and heat storage means operatively associated with the heat transfer means.

2. A system according to claim 1 wherein the means for transferring heat includes a heat pipe, having a molybdenum shell, and containing a molybdenum mesh wick and a potassium working fluid.

3. A system according to claim 2 wherein said heat storage means include a housing surrounding the heat transfer means; means within the housing attached to the heat pipe for drawing heat away from the heat pipe, an expandable container within the housing surrounding the heat transfer means and containing material for storing heat, and heat insulation means positioned between the housing and the expandable container.

* * * * *